(12) United States Patent
Sonnendorfer et al.

(10) Patent No.: US 8,511,755 B2
(45) Date of Patent: Aug. 20, 2013

(54) RESTRAINT DEVICE FOR CHILDREN

(76) Inventors: Horst Sonnendorfer, Puchheim (DE); Franz Wieth, Puchheim (DE)

( * ) Notice: Subject to any disclaimer, the term of this patent is extended or adjusted under 35 U.S.C. 154(b) by 288 days.

(21) Appl. No.: 12/866,368

(22) PCT Filed: Feb. 5, 2008

(86) PCT No.: PCT/DE2008/000200
§ 371 (c)(1),
(2), (4) Date: Nov. 9, 2010

(87) PCT Pub. No.: WO2009/097828
PCT Pub. Date: Aug. 13, 2009

(65) Prior Publication Data
US 2011/0049962 A1  Mar. 3, 2011

(51) Int. Cl.
*A47D 15/00* (2006.01)
(52) U.S. Cl.
USPC .............. 297/476; 297/474; 297/479
(58) Field of Classification Search
USPC ........... 297/474, 479, 476; 280/801.1
See application file for complete search history.

(56) References Cited

U.S. PATENT DOCUMENTS

| 3,248,148 | A | * | 4/1966 | Board et al. | 297/476 |
| 3,294,447 | A | * | 12/1966 | Riley | 297/476 |
| 3,306,661 | A | * | 2/1967 | Allen | 297/474 |
| 3,323,831 | A | * | 6/1967 | Buechler | 297/476 |
| 5,364,169 | A | | 11/1994 | Collins et al. | |
| 5,439,253 | A | * | 8/1995 | Trubiano | 280/801.1 |
| 5,529,381 | A | * | 6/1996 | Zhao et al. | 297/479 |
| 5,570,932 | A | * | 11/1996 | Collins et al. | 297/479 |
| 7,036,831 | B2 | * | 5/2006 | Coffman | 280/33.993 |
| 7,780,240 | B2 | | 8/2010 | Sonnendorfer et al. | |

FOREIGN PATENT DOCUMENTS

DE  202006017086 U1  3/2008
WO  2007016887 A1  2/2007

* cited by examiner

*Primary Examiner* — David Dunn
*Assistant Examiner* — Erika Garrett
(74) *Attorney, Agent, or Firm* — Laurence A. Greenberg; Werner H. Stemer; Ralph E. Locher

(57) ABSTRACT

A flat housing (1) holds a belt (4) which can be extended against the force of a spring, the belt being blocked to further extension as soon as the belt clasp (3) is situated in the belt buckle.

10 Claims, 3 Drawing Sheets

RESTRAINT DEVICE FOR CHILDREN

TECHNICAL FIELD

The invention relates to restraint belts for children on baby carriages/strollers, carry cots, high chairs or shopping trolleys.

PRIOR ART

Restraint belts of this kind are known in a very wide range of embodiments.

U.S. Pat. No. 5,263,726 shows a restraint belt which is passed around the child's stomach and between the child's legs, a solution which is not very ergonomic or comfortable.

Another disadvantage of this restraint belt is that the belt and the fasteners of the belt hang loose when not in use and can get caught in any components to which they come close.

This can lead disadvantageously to limits on utility and sometimes even to damage to the belt or the belt buckle.

In the case of belts which are attached to shopping trolleys, the loosely dangling belts can also hinder the movement of the basket flap and thereby make it impossible to nest the trolleys to save space.

U.S. Pat. No. 3,350,136 has disclosed a restraint device in which a cord is accommodated in a housing attached to the backrest of the child seat and is passed around the upper body of the child.

This cord is passed over a reel and is pulled out of a housing against the resistance of a spiral spring. When not in use, the cord is pulled back into the housing again by the force of the spiral spring.

The disadvantage with this restraint belt is the lack of comfort provided by the cord, which tends to have a more restrictive effect than a flat belt. Moreover, the construction of the restraint device has the disadvantage inherent in the design that, when a wide belt is used, the reel also has to be wider, and hence the housing likewise has to have correspondingly larger dimensions. A device of this kind with a wide belt then has a housing with a troublesomely large volume, which is a significant obstacle when nesting the shopping trolleys: the volume of the housing interferes with the pivotability of the basket flap and the shopping trolleys can no longer be nested so well and in such a space-saving manner.

Another disadvantage of the belt known from U.S. Pat. No. 3,350,136 is the fact that the belt is not securely fixed when placed around the child but is held only by the force of the spiral spring.

As a result, it is disadvantageously possible for a child to free itself from the belt in an unobserved moment simply by pulling the belt.

US 2004/0041457 has disclosed a restraint belt which is admittedly situated in a space-saving manner in the handle of a shopping trolley and, when not in use, is pulled back into the housing again by a spring.

This prior art eliminates the disadvantage in U.S. Pat. No. 3,350,136 of the large-volume housing for the belt; the disadvantage that the belt is tensioned only by the spring force and that the child can free itself by pulling on the belt remains.

DE 103 52 095 A1 has disclosed a spring-loaded restraint belt which is attached to the surface on which the child sits. With this restraint belt too, there is the disadvantage that the child can free itself by pulling on the belt. Another disadvantage is that the restraint belt is integrated into a rigid plate and cannot be used on a folding baby carriage/stroller.

U.S. Pat. No. 3,294,447 has disclosed a restraint system for a vehicle seat in which the belt is locked by means of a Bowden cable mechanism when the fastener attached to the free end of the belt is inserted into the buckle. The disadvantage with this prior art is the large-volume belt reel, which makes it impossible to achieve the flat restraint device.

U.S. Pat. No. 3,248,148 has disclosed a restraint device for a seat in which the belt is wound up on a reel at the side of the seat, and the belt extends through to the other side of the seat under the seat surface via a channel. The free end with the fastener is situated at the end of the channel. From there, the belt is pulled across the body of the person to be secured, and the fastener is inserted on the side of the seat on which the reel is located. The disadvantage is the channel running under the seat surface, which is very troublesome for use on a shopping trolley.

DISCLOSURE OF THE INVENTION

Technical Object

It is an object of the invention to provide a flat restraint device for children which ensures that a child is securely strapped in by enabling the length of the belt to be adapted in a simple manner to the specific size of the child; when inserted the and the belt cannot be loosened by the child.

It is a further object of the invention to avoid damage to the belt and to the belt catch. Where the restraint belt is used on a shopping trolley, it is a further object of the invention to avoid a situation where damage occurs to parts of the shopping trolley on which it is mounted or to another shopping trolley or to the belt system itself through catching of the unused belt or of the unused belt catch.

It is a further object of the invention as far as possible to configure the entire restraint device in such a way that it does not cause trouble when a baby carriage/stroller, e.g. what is referred to as a "buggy", is being folded up.

The restraint belt arrangement should furthermore be ergonomic and comfortable.

Technical Solution

These objects are achieved by a restraint device in which the belt and the belt catch attached to the free end of the belt are pulled into a flat housing by a spring force in the idle state and, in this state, do not project beyond the contours of the housing, while the belt can be pulled out of the housing against the spring force, and the belt is fixed in such a way by the latching in of the belt catch in a receptacle that it cannot be pulled further out of the housing.

In a development of the invention, provision is made to ensure that, once the belt catch has latched into the receptacle, the belt can no longer be pulled further out of the housing but continues to be pulled into the housing by the spring force. The effect is that a belt which is initially placed loosely around the child automatically fits snugly at all times.

In a development of the invention, the housing and the mechanism situated in the housing are designed in such a way that the housing and the mechanism situated in the housing are deformable.

Advantageous Effects

By means of the present invention, it is advantageously achieved that the user automatically sets the length of the belt correctly and that a child cannot adjust the length of the belt and, in particular, cannot loosen the belt to such an extent in an unobserved moment that it can free itself from the belt.

The flat, deformable housing has the advantage that it does not have a significant bulk and, in particular, it does not increase the nesting interval with respect to a shopping trolley without a restraint element when nesting shopping trolleys, nor does it cause trouble when folding up a baby carriage/stroller.

BRIEF DESCRIPTION OF THE DRAWINGS

The invention is described below by means of 4 figures with reference to two possible illustrative embodiments.

DESCRIPTION OF THE INVENTION

Figure 1:
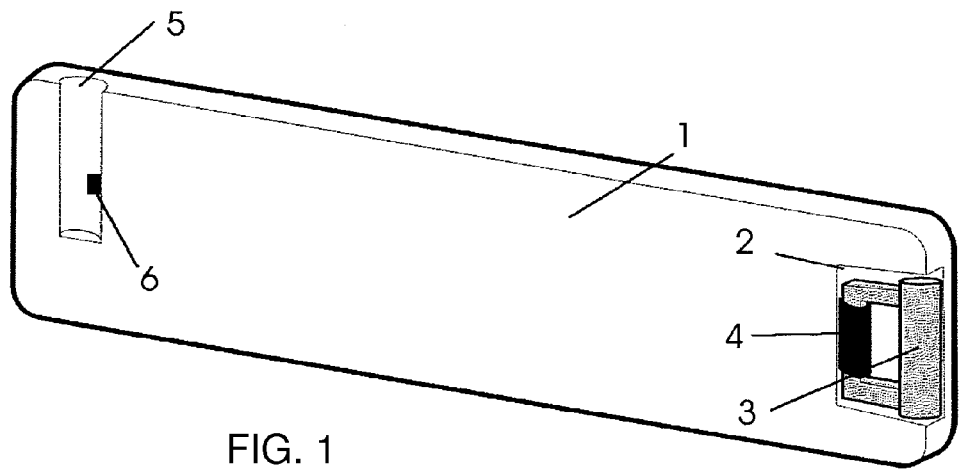
FIG. 1 shows the safety belt when not in use, in perspective representation.

The housing 1 is of substantially flat construction. It is approximately as wide as the back of an average child. On one side, the housing 1 has a hollow 2, which accommodates the belt catch 3. Only a small section of the belt 4 is visible, while the remaining part of the belt 4 is within the housing 1.

On the opposite side, the side remote from the hollow 2, the housing 1 has a recess 5, into which the belt catch 3 can latch. An actuating element 6, which is connected to a mechanism accommodated within the housing, can be seen in this receptacle 5.

Figure 2:
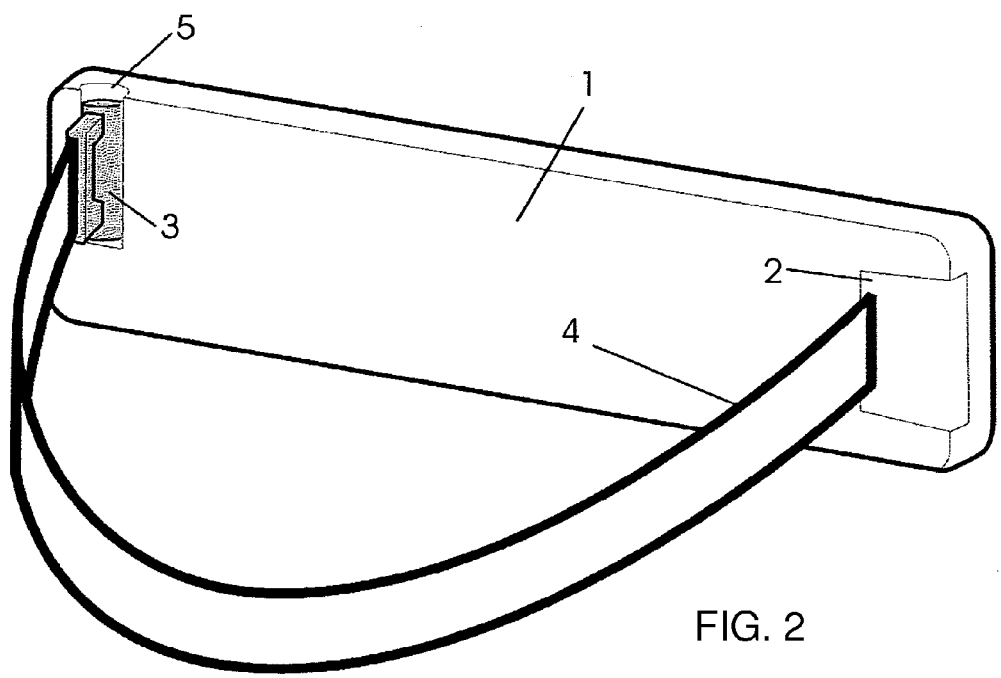
FIG. 2 shows the safety belt when in use, in perspective representation.

FIG. 2 shows the belt 4 in the extended state. The belt catch 3 is inserted into the recess 5 and latched therein. The latching of the belt catch 3 into the recess 5 has moved the actuating element 6, and locking of the belt 4 is accomplished by means of the mechanism accommodated in the housing 1.

As long as the belt catch 3 is in the recess 5, the actuating element 6 remains in a position which locks the belt 4.

Figure 3:
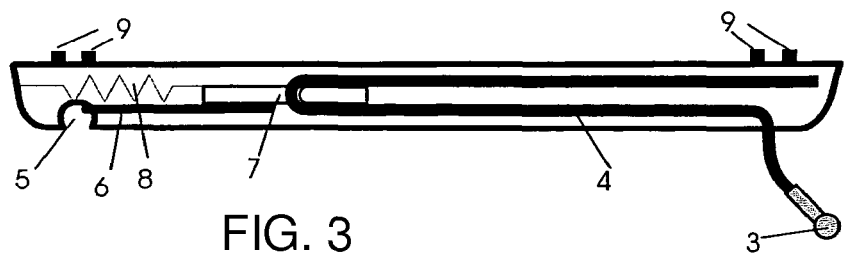
FIG. 3 shows the safety belt in section.

FIG. 3 shows the interior of the housing 1 in section. The belt 4 has been pulled out somewhat. The belt 4 extends in a loop around a slide 7. This makes it possible to accommodate a sufficiently long belt 4 in the housing 1 while simultaneously making the housing 1 flat.

A tension spring 8 is attached to the slide 7 and, as a result, pulls the belt 4 into the housing. As the belt 4 is pulled out, the spring 8 is tensioned.

If the intention is to accommodate a particularly long belt 4 in the housing 1, it is also possible to provide more than one change in direction and more than one slide 7 in the housing 1, by means of which the belt 4 then extends in a meander shape.

The change in direction is made flat and is not bulky.

This advantageously makes it possible to dispense with a large-volume reel for winding up the belt.

Overall, the housing 1 is of two-dimensionally extended design in order to offer the child a large contact area, thereby avoiding unpleasant pressure points.

The housing 1 can be fastened to the child seat or shopping trolley using conventional fastening means, e.g. screws or clips.

Figure 4:
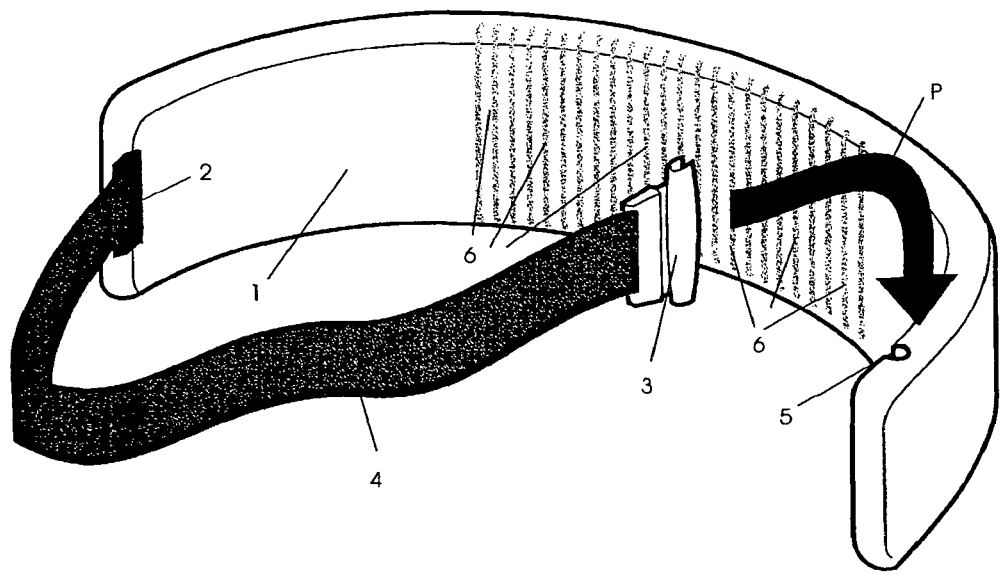
FIG. 4 shows a development of the invention with a flexible housing.

FIG. 4 shows a development of the invention, in which the housing 1 and the mechanism accommodated in the housing 1 are of deformable design. This development enables the invention to be used even where a rigid structure is troublesome, in the case of a folding baby carriage/stroller, referred to as a "buggy", for example.

In the view shown, the belt 4 has been pulled out. In the region of the opposite side of the housing 1 there is the recess 5, into which the belt catch 3 can be inserted.

The arrow P indicates how the belt catch 3 attached to the end of the belt 4 can be pushed into the recess 5. In this embodiment too, the belt 4 is locked in the manner already described.

The housing 1 and the mechanism contained therein is of deformable configuration. In the example shown, this deformability is achieved by means of a rib-type area 6 of the housing 1.

In order to permit the deformation, it is also possible to use any other method familiar to a person skilled in the art, e.g. by using articulations and/or expansion joints.

Figure 5:
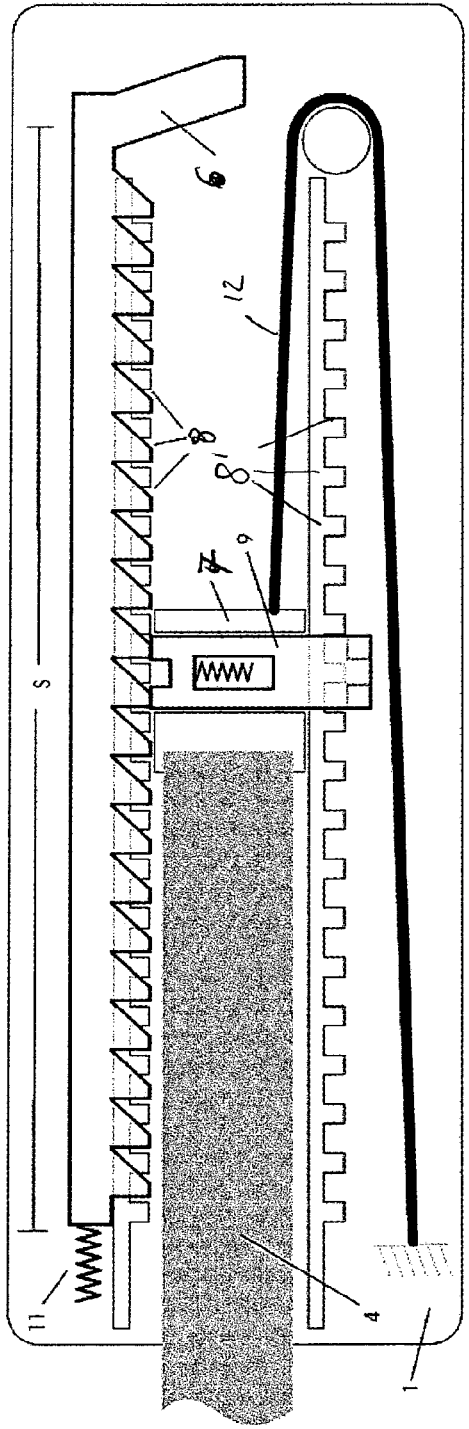
FIG. 5 and FIG. 6 show a detail view of the inner mechanism.

FIG. 5 shows a view of the interior of the housing 1. The belt 4 is connected to the slide-type holding element 7, which can be moved along section s.

In the view shown, the belt 4 has already been pulled out somewhat, and the slide-type holding element 7 is therefore approximately in the center of section s. As the belt is pulled out, an elastic element 12 is stretched, said element also pulling the belt 4 back into the housing again.

A fixing part 9 is provided under spring load on the slide-type holding element 7. This fixing part 9 can engage in the grooves 8 and 8', which are arranged along the movement section s. In the view shown in FIG. 5, the entry to the two rows of grooves 8 is blocked by a control element 6.

Figure 6:
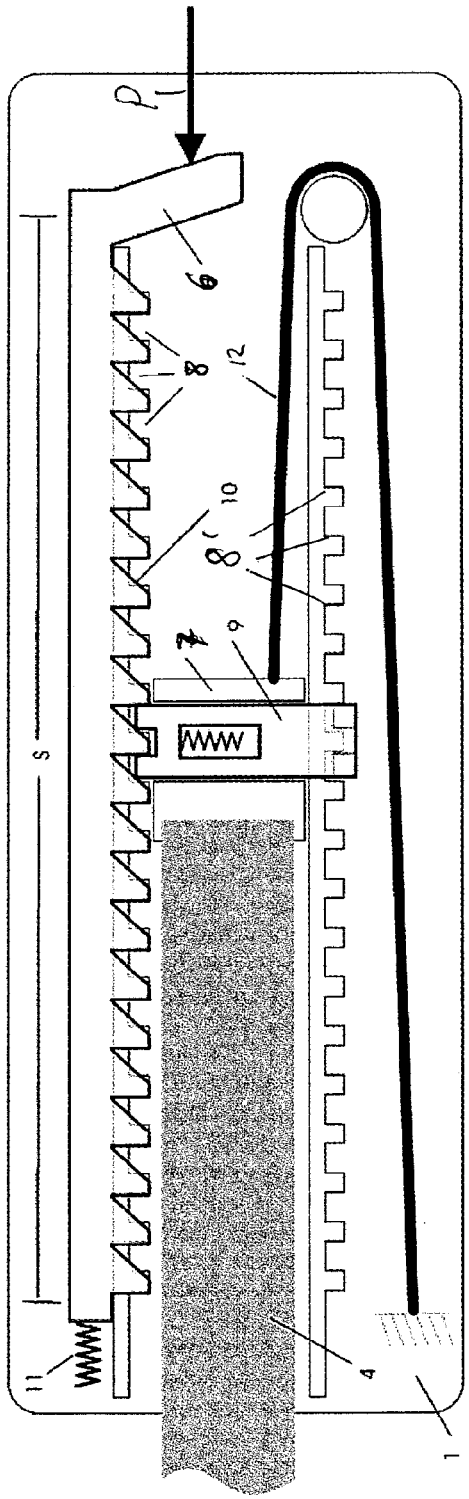

FIG. 6 shows the situation known from FIG. 5, except that the control element 6 is now in a new position offset in the direction of arrow P, in which the entry to the grooves 8 and 8' is open. Accordingly, the fixing element 9 now engages in the grooves 8 and 8'.

The control element 6 occupies this position until the fastener of the belt is in the belt buckle. In this position, the spring 11 is compressed.

Once the belt fastener is removed from the belt catch, the spring 11 pushes the control element 6 back into the position known from FIG. 5. During this process, the oblique contour 10 on the control element 6 acts on the fixing element 9 and pushes it out of the grooves 8 and 8'. The slide-type holding element 7 can now once again be moved along the movement section s.

EMBODIMENT(S) OF THE INVENTION

The invention is not restricted to the embodiments described.

INDUSTRIAL APPLICABILITY

The invention is industrially applicable within the wide product range of shopping trolleys, child seats, baby carriages/strollers and folding baby carriages/strollers.

The invention claimed is:
1. A restraint belt assembly for children, comprising:
a restraint belt having a belt catch;
a housing holding said belt and retaining said belt by a spring force, enabling said restraint belt to be pulled out of said housing against the spring force, and, when said belt is not in use, the spring force pulling said belt back into said housing; and wherein said belt is fixable to said housing by latching said belt catch in a receptacle formed on said housing, wherein the latching prevents said belt from being pulled further out of said housing;

a sliding section formed in said housing and grooves along said sliding section;

a holding element connected to said belt and movable along said sliding section, said holding element having fixing parts disposed to engage in accordance with a state of a control element; and wherein, after said belt catch has been inserted into said receptacle, said control element assumes a state in which engagement of said fixing parts in said grooves is possible; wherein said control element covers openings of said grooves until said belt catch has been inserted into said receptacle.

2. The restraint belt assembly according to claim 1, wherein said housing has defined exterior contours and wherein said belt and said belt catch do not project beyond said contours of said housing when not in use.

3. The restraint belt assembly according to claim 1, wherein said belt extends in a loop or meander shape within said housing.

4. The restraint belt assembly according to claim 1, wherein, once said catch has latched into said receptacle, said belt is prevented from being pulled further out of said housing, while said belt can be pulled back into said housing by the spring force.

5. The restraint belt assembly according to claim 1, wherein said housing and a mechanism contained within said housing are reversibly deformable.

6. The restraint belt assembly according to claim 1, wherein said holding element is locked against movement along said sliding section while said fixing parts engage in said grooves.

7. The restraint belt assembly according to claim 1, wherein said control element has a contour which moves said fixing part out of said grooves as said belt catch is removed from said receptacle.

8. The restraint belt assembly according to claim 1, wherein said belt extends in a loop around a holding element.

9. The restraint belt assembly according to claim 8, which comprises an elastic element attached to said holding element for pulling said belt into said housing.

10. The restraint belt assembly according to claim 8, wherein said belt extends in a meander shape through more than one change of direction in said housing, and said element in said housing is one of a plurality of elements over which said belt extends in a meander shape.

* * * * *